Patented May 6, 1930

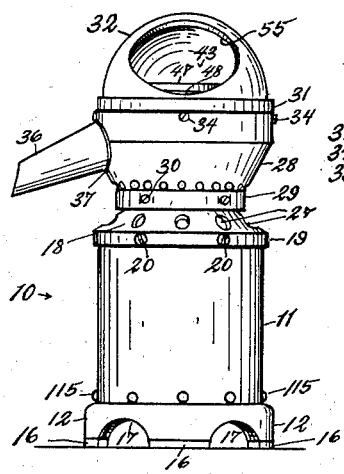
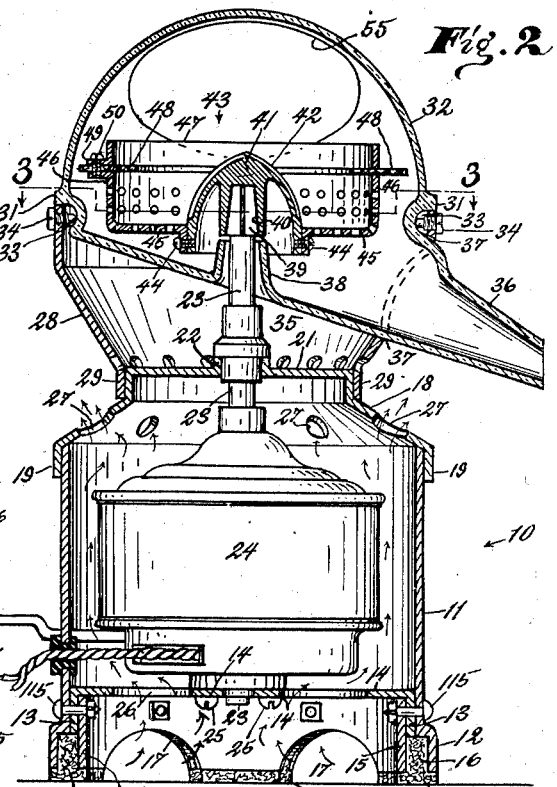
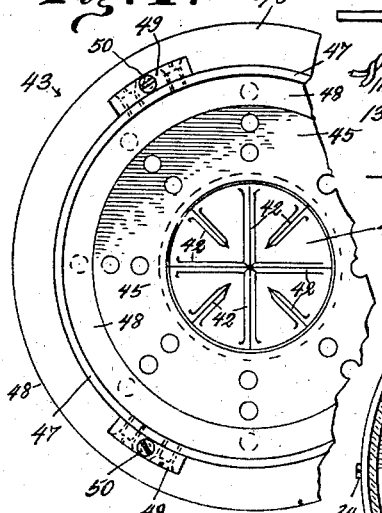
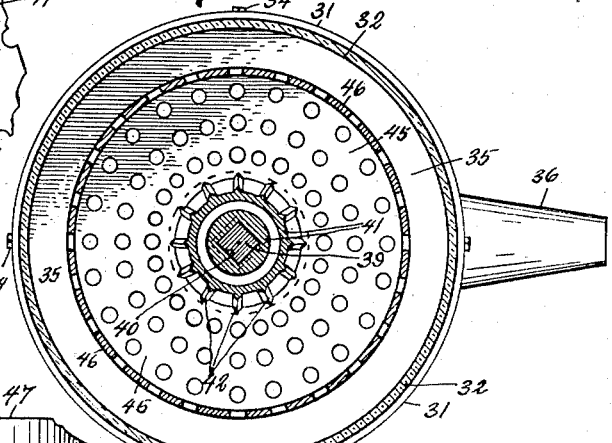
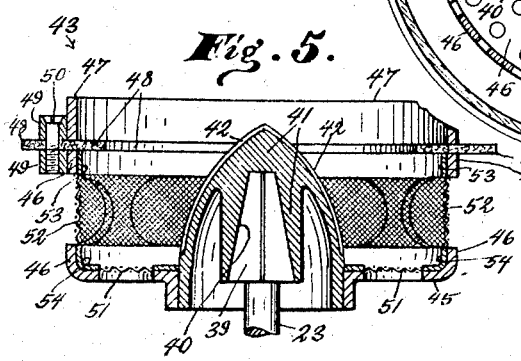
Inventor.
Abraham Miller.
by
Lockwood & Lockwood,
His Attorneys.

1,757,326

UNITED STATES PATENT OFFICE

ABRAHAM MILLER, OF LOS ANGELES, CALIFORNIA

FRUIT-JUICE SEPARATOR

Application filed June 25, 1927. Serial No. 201,440.

This invention relates to a fruit juice separator and an object thereof is to provide a simple and efficient means for separating the juice from the pulp of fruit. To that end I provide an apparatus for first converting the fruit into a juicy mass and then separating the juice from the pulp by means of centrifugal force. In other words, the apparatus includes a disintegrator that is operated to mash out into a mass the edible portion of oranges, lemons, grapefruit and the like; and then by centrifugal force cause the juice remaining in the mass to separate from the pulp.

Another object is to provide a separator that will remove substantially all the desired juice from the fruit so that there will be a minimum amount of waste.

Another object is to provide a separator that is relatively quick in performing its function; that is the apparatus is so constructed and operated that the mashing of the fruit into a mass and then separating the juice therefrom are almost simultaneous so that the apparatus is a great saver of time as well as labor for juice need not be again strained as is now customary.

A feature of invention is shown in the construction, combination and arrangement of parts whereby a fruit juice separator is provided that is easy to construct, assemble and operate, pleasing in appearance, effective in operation and strong and desirable in use.

Other objects, advantages and features of invention may appear from the accompanying drawings; the subjoined detailed description and the appended claims.

The accompanying drawing illustrates the invention.

Figure 1 is a side view of a fruit juice separator that is constructed in accordance with this invention; Fig. 2 is an enlarged central vertical section through the apparatus; Fig. 3 is a slightly enlarged cross section on the staggered line 3—3 of Fig. 2; Fig. 4 is an enlarged fragmental plan view of the centrifugal separator detached from the apparatus; and Fig. 5 is a central vertical cross section through the centrifugal separator showing the openings through the wall and floor enlarged and covered with wire screens.

The apparatus includes a motor housing 10 that is preferably formed of a hollow cylinder 11 that has a lower end portion 12 offset outwardly which, in combination with the downwardly extending flange 13 of a disk 14 and an inner ring band 15 that are secured together by bolts 115 form sockets for the tread blocks 16.

The end 12 and ring band 15 are recessed at 17 as indicated in Figs. 1 and 2 to form air inlets to the cylinder 11; and also to divide the base into four legs like extensions spaced equidistant apart that terminate in resilient blocks 16 that preferably are formed of rubber.

The upper end of the cylinder 11 is closed by a cap 18 that has a downward flange 19 that is adapted to telescope over the end of the cylinder 11 and be detachably secured thereto by set screws 20 shown in Fig. 1.

The upper end of the cap 18 terminates in an upward extension 21 that has a bearing 22 for a vertical shaft 23 of a motor 24. The motor 24 is arranged centrally on the disk 14 and is secured thereto by screws 25, as shown in Fig. 2.

The disk 14 has perforations 26, and the cap has perforations 27 so that air can circulate from underneath the apparatus up through the cylinder 11 to keep the motor cool.

A bowl seat 28 is provided with a lower cylindrical flange 29 that is adapted to telescope over the extension 21, and is detachably secured thereto by set screws 30, see Figs. 1 and 2. The upper end of the bowl seat forms a support for an annular flange 31 of the bowl 32, and the bowl is preferably formed of acid-resisting material, such as porcelain, china, glass or the like.

This bowl 32 has an annular recess 33 into which set screws 34 are extended to detachably hold the bowl in place. The bowl 32 is provided with a downwardly inclined bottom 35 that, at its lowest inclination, terminates in a spout 36 that is adapted to extend outward through a hole 37 through the bowl seat 28 so that fruit juice will flow out of the bowl by gravity.

A hollow cone-shaped guard 38 is arranged centrally and extends upwardly from the bottom of the bowl, and is adapted to prevent fruit juice from contacting with the shaft 23 or escaping from the bowl down on the motor 24.

The upper end of the shaft 23 is provided with a four-sided tapered shank 39 that is adapted to be fitted into a socket 40 in the body of a fruit disintegrator 41. The shank and socket are constructed so that the disintegrator can be quickly and easily placed on or removed from the shaft; and when in use is held on the shaft by gravity.

The disintegrator 41 is conical and it is provided with ribs 42 that are adapted to disintegrate the edible portions of oranges, lemons, grapefruit or the like when the appliance is in use.

A centrifugal separator 43 is secured to the base of the disintegrator by screws 44, as shown in Fig. 2, or by brazing, as indicated in Fig. 5. This separator is provided with a perforated bottom 45 and an annular perforated vertical lower wall 46 that preferably are integral.

An annular vertical extension 47 is aligned with the wall 46, but is spaced away from it by a splash-board 48 arranged on the upper end of the wall 46, and the splash board is annular and disk-like in form. The wall board and extension are secured together by means of flanges 49 and screws 50.

The splash board extends both outwardly and inwardly from the wall so that it coacts with the annular extension to prevent fruit juice from splashing upward out of the separator, and also to prevent juice thrown by centrifugal force against the inner wall of the bowl from splashing up over the separator; and preferably the board 48 is formed of resilient material such as rubber.

If desired the separator 43 can be formed as shown in Fig. 5, in which the perforations in the bottom 45 and wall 46 are greatly enlarged and covered with wire screens 51, 52 that are secured in place by ring bands 53, 54 that are brazed to the wall.

The bowl 32 is preferably formed with a top portion that is spherical in form with an opening 55 therethrough that is sufficiently large for an operator's hand to enter while holding the half of an orange or other fruit to be disintegrated.

In operation a half of a fruit, such as an orange, lemon, grapefruit or the like, is inserted through the opening 55 and placed with the mid-center of the fruit on top point of the disintegrator. Then with the motor running to rotate the disintegrator and separator the fruit is pressed downward by the hand of the operator toward the base of the disintegrator until the edible portion of the fruit has been broken up into a mass and thrown against the wall 46 of the separator where it is held by centrifugal force; and simultaneously the juice escapes from the pulp and flows by gravity out of the bowl 32 through the spout 36, it being understood, of course, that a proper receptacle such as a drinking glass, is arranged under the spout to receive the fluid.

As stated, centrifugal force causes the pulp of the fruit to adhere to the wall 46 where it flattens out and thereby forces substantially all of the juice from the fruit so that waste is reduced to a minimum.

It is understood, of course, that in operation the pulp is frequently removed from the wall 46 so that the perforations therethrough will not become clogged to prevent the escape of the juice.

It is also understood that the separator 43 can be constructed in various ways, and applicant reserves all right to such modifications as do not materally differ from his fruit juice separator.

I claim as my invention:

1. A fruit juice separator including a stationary bowl with an inclined bottom and fluid outlet and a hand opening in the upper part of said bowl, a rotatable fruit disintegrator therein on which fruit may be held by hand, a centrifugal perforated wall surrounding the disintegrator and rotatable therewith, and a splash board secured in the upper part of said wall, whereby the fruit can be placed and held on the disintegrator without the juice being thrown up on the person holding the fruit thereon.

2. A fruit juice separator including a stationary bowl with an inclined bottom and fluid outlet and a hand opening in the upper part thereof, a rotatable fruit disintegrator thereon on which fruit may be held by hand, means extending up through the bottom of the bowl for rotating said disintegrator, a central perforated wall surrounding the disintegrator and rotatable therewith and formed in two sections, one above the other, and a horizontal splash board secured between said two sections, substantially as and for the purpose set forth.

In witness whereof, I have hereunto affixed my signature.

ABRAHAM MILLER.